United States Patent [19]

Johnson

[11] 4,331,404
[45] May 25, 1982

[54] HAND HELD CAMERA HAVING PROTECTABLE AND BALANCED SWITCHING ARRANGEMENT

[75] Inventor: Bruce K. Johnson, Andover, Mass.

[73] Assignee: Polaroid Corporation, Cambridge, Mass.

[21] Appl. No.: 194,571

[22] Filed: Oct. 6, 1980

[51] Int. Cl.³ .................. G03B 15/03; G03B 17/04
[52] U.S. Cl. .................... 354/126; 354/187; 354/288; 354/266
[58] Field of Search ............. 354/35, 60 F, 27, 126, 354/145, 158, 187, 266, 288; 362/3

[56] References Cited

U.S. PATENT DOCUMENTS

| | | | |
|---|---|---|---|
| Re. 29,764 | 9/1978 | Stoneham | 354/145 |
| 679,654 | 7/1901 | Wernette | 200/159 A |
| 3,252,394 | 5/1966 | Jakob et al. | 354/126 |
| 3,522,764 | 8/1970 | Biber et al. | 354/195 |
| 3,705,540 | 12/1972 | Reed et al. | 354/139 |
| 3,720,145 | 3/1973 | Johnson et al. | 354/149 X |
| 3,731,014 | 5/1973 | Brady | 200/5 A |
| 3,922,514 | 11/1975 | Greenhut | 200/246 |
| 4,085,414 | 4/1978 | Burgarella et al. | 354/145 |
| 4,153,903 | 5/1979 | Pizzuti et al. | 354/195 |
| 4,196,328 | 4/1980 | Ishikawa | 200/246 |
| 4,231,645 | 11/1980 | Davis et al. | 354/145 |
| 4,268,146 | 5/1981 | Johnson | 354/145 |
| 4,291,965 | 9/1981 | Johnson et al. | 354/195 |

FOREIGN PATENT DOCUMENTS 1170085 5/1964 Fed. Rep. of Germany .
1233728 2/1967 Fed. Rep. of Germany .

Primary Examiner—L. T. Hix
Assistant Examiner—William B. Perkey
Attorney, Agent, or Firm—Leslie J. Payne

[57] ABSTRACT

A hand held camera is disclosed having a camera body with a flash unit mounted thereon for movement between an erect position and a stored position. For effecting a first photographic cycle, there is a first actuator manually operative. This actuator is positioned so that one hand of the operator actuates it while simultaneously supporting the camera therewith. A second actuator is manually operative for affecting the photographic cycle when the second actuator is operative generally during actuation of the first actuator. The second actuator is positioned on the flash unit so as to only be accessible when the latter is in its erect position and so that a second hand must operate it and so that during operation of both actuators, both hands of the operator can be located for effectively holding the camera in a stable condition.

6 Claims, 4 Drawing Figures

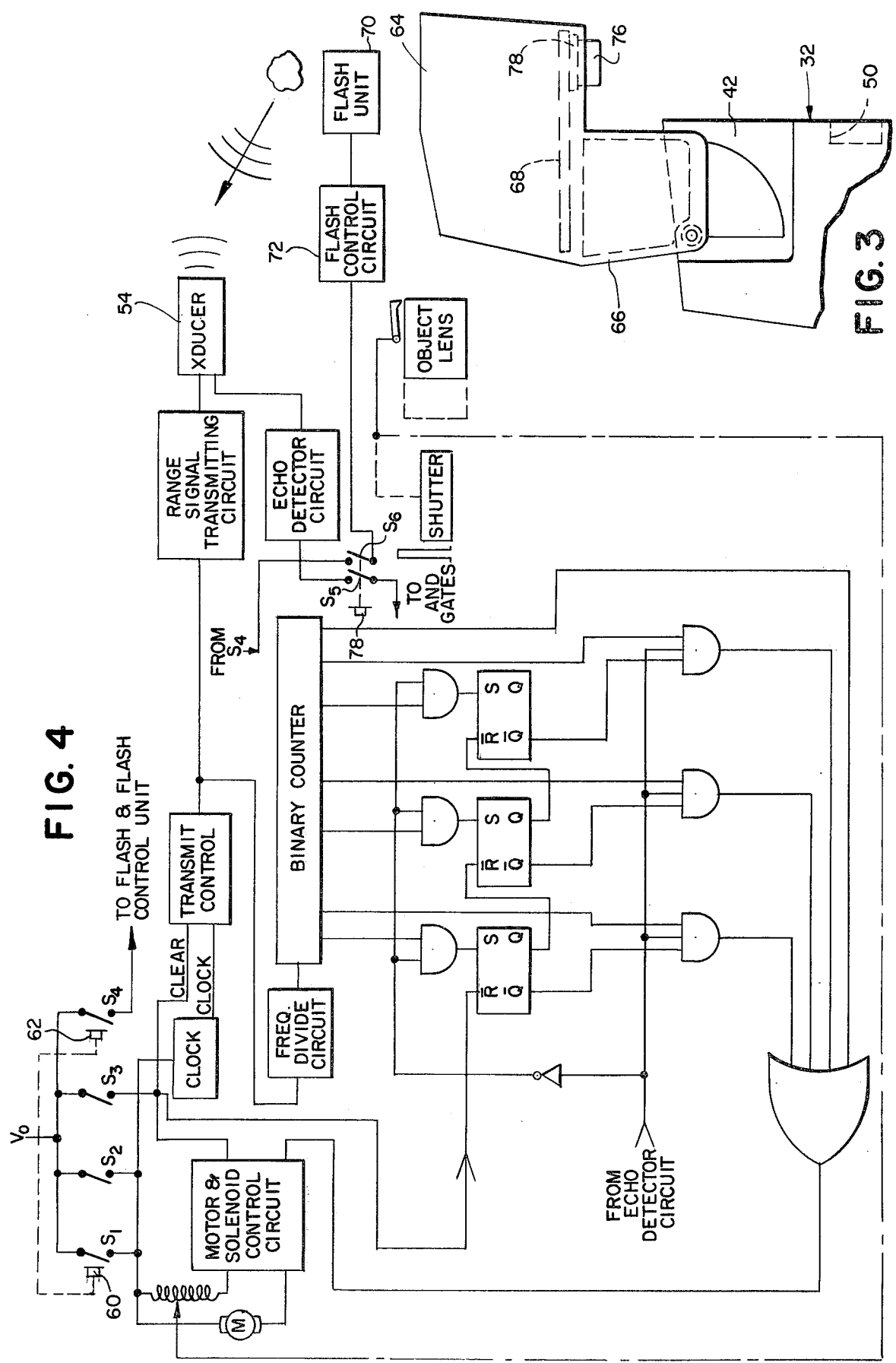

HAND HELD CAMERA HAVING PROTECTABLE AND BALANCED SWITCHING ARRANGEMENT

BACKGROUND OF THE INVENTION

1. Field of the Invention

The present invention relates to the field of photography. More specifically, it relates to photographic apparatus having a switching arrangement protecting against inadvertent switch actuation while permitting simultaneous actuation of a plurality of switches in a manner facilitating stability.

2. Description of the Prior Art

Increasingly, supplemental flash illumination is being used in daylight for softening shadow areas or improving image sharpness. This technique is generally referred to as fill-in flash and has been known in the photographic arts for many years. Heretofore, many kinds of photograhic apparatus having built-in flash have been proposed for achieving fill-in flash.

An example of a significantly improved camera having a built-in flash unit is described in copending application Ser. No. 54,598, filed July 3, 1979, now U.S. Pat. No. 4,268,146 and assigned in common herewith. As described therein, a camera is provided with a foldable flash unit movable between an operative, erect position and a folded, storage position. In the storage position, the camera housing and flash unit housing cooperate to form an enclosure for protectively covering the camera's objective lens and a flash window of the flash unit. For sequentially charging the flash and commencing exposure, a dual actuator switching arrangement is connected to one side of the camera body. Actuation of such dual switching arrangement is performed by a single hand of the operator. While the foregoing photographic apparatus possesses many advantages, there are potential disadvantages. For example, the flash will be fired each exposure cycle. Hence, taking photographs through a window is troublesome because of the reflection factor of the artificial light. Moreover, with the foregoing camera a sonic transducer is used for automatically focusing in accordance with subject range. Thus, when taking photographs through a window, which is a sonically reflective and light transmissive material, the focusing will be adversely affected. This is so since the reflected sonic waves cause the lens system to focus on the window instead of the desired object beyond the window which is intended to be photographed.

Another example of an improved camera having a built-in flash is described in copending application Ser. No. 54,652, filed July 3, 1979, now U.S. Pat. No. 4,231,645 and is in common assignment herewith. With this camera the flash need not take place with each exposure. However, photographs taken through windows are adversely affected. This is because the sonic ranging system will cause the lens system to focus on the window instead of the desired object beyond the window. Thus, it is advantageous to selectively suppress flash illumination and avoid focusing errors with automatic focusing systems during the exposure cycle.

One approach for overcoming the foregoing problems is described in copending application Ser. No. 194,572, now U.S. Pat. No. 4,291,965, issued Sept. 29, 1981, entitled "Apparatus for Automatically Selecting a Preselected Focal Position for a Lens System", by Bruce K. Johnson et al., concurrently filed and commonly assigned herewith. A manually actuatable switch arrangement is broadly disclosed therein for simultaneously suppressing flash firing and disabling the rangefinder for enabling automatic setting of the lens assembly. With such a photographic apparatus the switch is actuated generally folowing commencement of the exposure cycle. It will be appreciated that such a switch should not be inadvertently actuated. Otherwise, both the flash fire system and ranging system will be disabled. Accordingly, it is important to prevent such inadvertent actuation. Moreover, the foregoing switching arrangement should be actuated generally contemporaneously with the initiation of the exposure cycle. Accordingly, positioning of a second manual switch actuator on the camera is important from the standpoint of not wanting to sacrifice stability or other photographic functions.

SUMMARY OF THE INVENTION

It is an object of the present invention to provide an improved switching arrangement for photographic apparatus. Briefly, in accordance with this invention there is provided a hand held camera having a camera body with a flash unit mounted thereon for movement between an erect, operative position and a stored, inoperative position. A first manually operative actuator is provided for effecting a photographic cycle. The first actuator is positioned so that one hand of the operator may be used to actuate it while simultaneously supporting the camera therewith. A second actuator is manually operative for affecting the photographic cycle when the second actuator is operative generally during actuation of said first actuator. The second actuator is positioned on the flash unit so as to only be accessible when the latter is in its erect position and so that a second hand must operate it and so that during operation of both actuators, both hands of the operator are located for effectively holding the camera in a stable condition.

Among the other objects of the invention are, therefore, the provision of an improved switching arrangement for a hand held camera; the provision of an improved switching arrangement for protecting against inadvertent switch actuation; the provision of an improved switching arrangement for permitting generally contemporaneous actuation of multiple switches without sacrificing camera stability and otherwise interfering with other photographic functions.

Other objects and further scope of applicability of the present invention will become apparent from the detailed description to follow when taken in conjunction with the accompanying drawings wherein like parts are designated by like reference numerals throughout the several views.

BRIEF DESCRIPTION OF THE DRAWINGS

FIG. 3 is a side elevational view showing a fragmentary portion of the foldable strobe and the improved switching arrangement of this invention; and FIG. 4 is a block circuit diagram.

DETAILED DESCRIPTION

Figure 1:
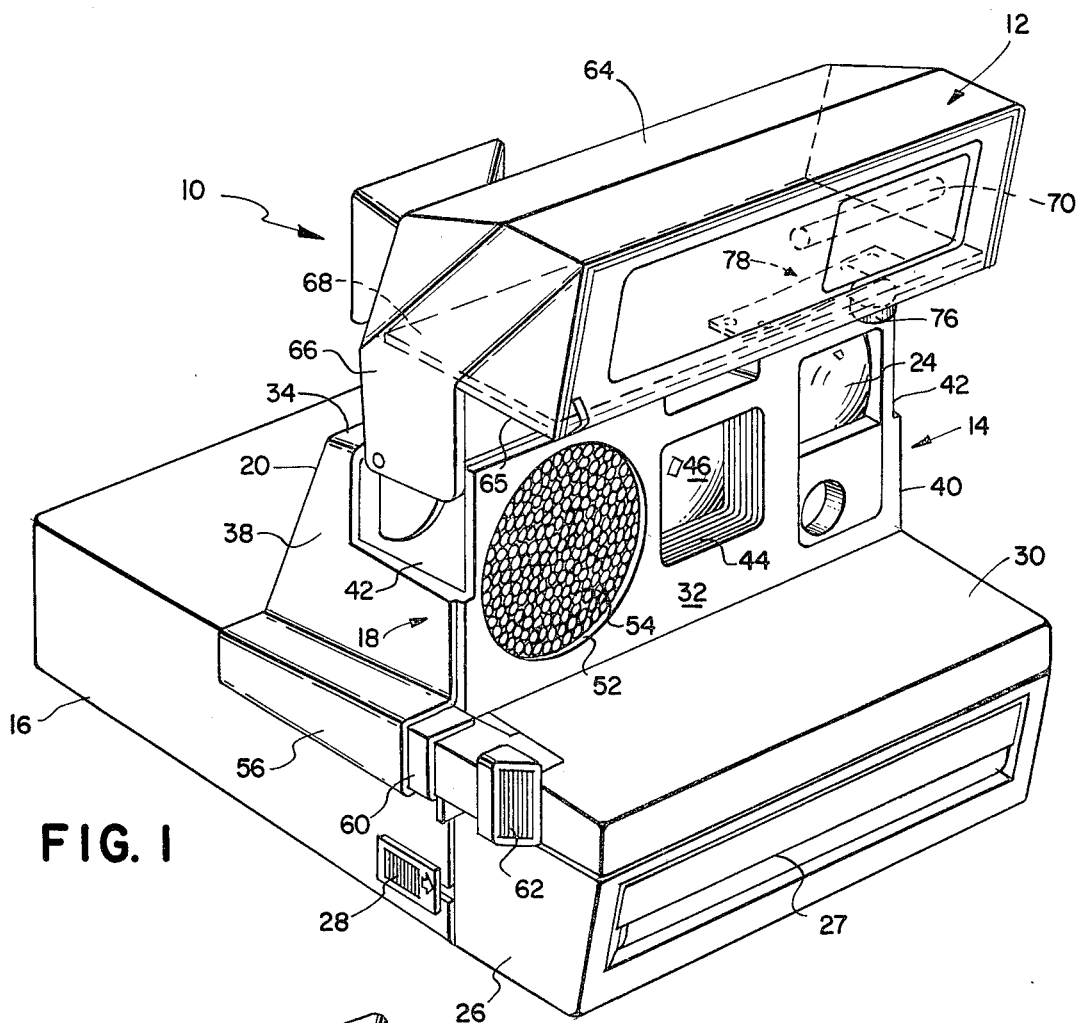
FIG. 1 is a persepective view of a photogaphic camera having a foldable flash unit and the improved multiple positioned switchinng arrangement of the present invention.
Figure 2:
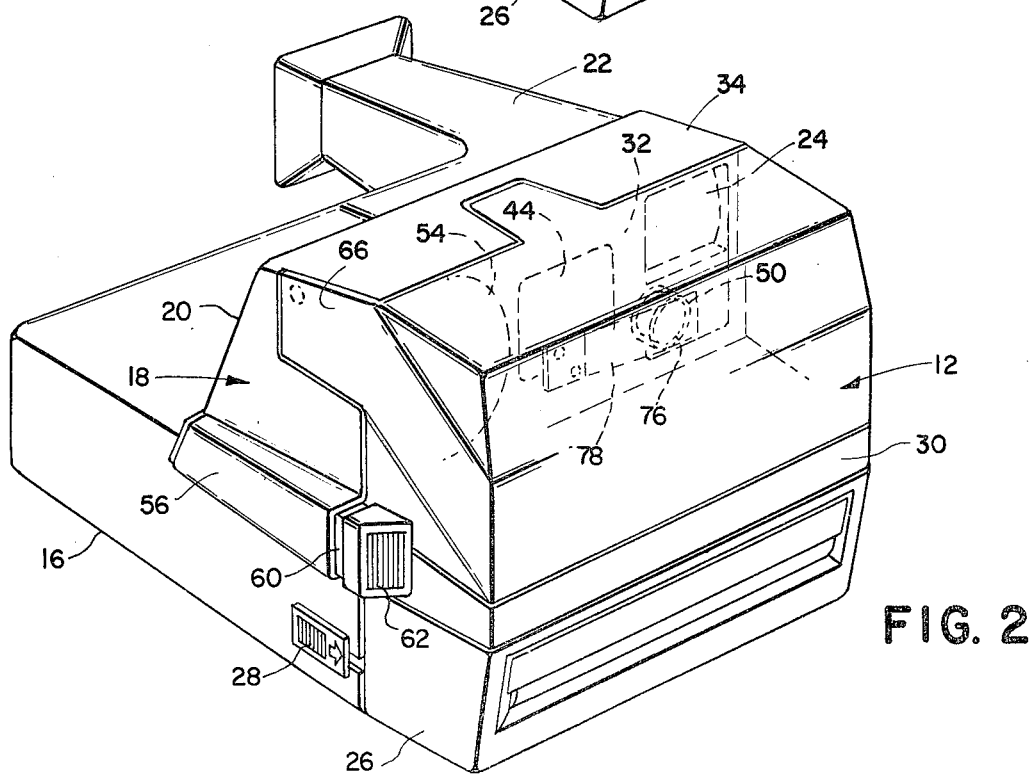
FIG. 2 is a perspective view similar to FIG. 1, but showing the foldable flash in the folded position.

With initial reference to FIGS. 1 and 2, there is shown a compact photographic camera apparatus 10. Pivotally attached to the camera 10 is a foldable flash unit 12 of the electronic strobe type. In the illustrated embodiment, the camera 10 is a compact, highly automated self-developing type utilizing a reflex or folded exposure optical path. Such flash unit 12 is movable between an operative erect position (FIG. 1) and an inoperative folded storage position (FIG. 2). For a more detailed description of the depicted camera 10 and flash unit 12, reference is made to copending application Ser. No. 54,598, filed July 3, 1979, now U.S. Pat. No. 4,268,146 which is assigned in common with the instant application. Since details of such construction do not, per se, form an aspect of this invention, only such details of construction necessary to understand the present invention will be given.

In the erect position, the flash unit 12 is positioned for directing its light output into the camera's optical field of view. This provides supplemental transient illumination for facilitating exposure. In the inoperative or storage position, the flash unit 12 is arranged to nest over the forward portion of camera 10. This latter arrangement provides a protective enclosure for the flash unit 12 as well as a forward camera portion, as will be described more fully.

With continued reference to FIGS. 1 and 2, there is shown a camera housing 14 having a generally parallelepiped base section 16 defining in part a film pack receiving chamber (not shown). Upwardly extending from the base section 16 is a forwardly facing housing section 18. Many of the camera components associated with exposure control and processing operations are retained in the housing section 18. In the rear of the housing section 18 is a section 20 for defining an exposure chamber (not shown). The housing section 20 also includes a rearwardly extending viewfinder lens tube 22 which is optically aligned with a viewfinder window 24. The exposure chamber receives a self-developing film pack (not shown) of the type holding a plurality of self-developing film units along with a battery for powering the camera's electrical system. A representative example of such a film pack for use in cameras of the above type is described generally in commonly assigned U.S. Pat. No. 3,877,045, issued on Apr. 8, 1975, to S. M. Bloom et al.

Pivotally coupled to the forward end of the base section 16 is a film loading door 26 which includes a pair of processing rollers (not shown). In use, the film loading door 26 is normally in the illustrated closed position. As so positioned, the pressure applying rollers (not shown) are aligned with a film pack exit slot and an elongated film exit slot 27 formed in a front wall of the loading door 26. This construction allows for advancement of each of the film units exteriorily of the camera 10. For effecting loading and unloading of the film pack from the exposure chamber, the film loading door 26 is pivoted downwardly to an open position (not shown). This is, in part, accomplished by movement of a slide latch button 28 from the position shown to an unlatching position (not shown). When in the open position, the film pack can be inserted in or removed from the film pack receiving chamber.

Extending forwardly of the housing section 18 is an apron housing 30 positioned over the film loading door 26. In use, the apron housing 30 protectively covers a plurality of internal camera components.

Referring black to the housing section 18, it is defined, in part, defined by a lens mounting wall 32; a top wall surface 34 extending rearwardly from the upper edge of the lens wall 32; and a pair of oppositely spaced side walls 38 and 40 joining the corresponding lateral edges of surfaces 32 and 34. Each of the side walls 38, 40 has a recessed flash unit mounting section 42. Also provided in the housing section 18 is a centrally disposed aperture 44 for a variable focus objective lens arrangement 46. Located below a viewfinder lens window 24 is a photocell aperture 50 which provides optical access to an exposure control photocell (not shown). Also provided is a transducer aperture 52 for allowing access to an ultrasonic energy transducer 54; forming part of an automatic lens focusing system of the camera 10. Such a focusing system is of the type more fully described in commonly assigned U.S. Pat. No. 3,522,764.

Enclosed by the exposure chamber defining section 20 is a mirror (not shown) positioned in optical alignment with the taking lens 46. This mirror is for reflecting image forming light passing incident thereon downwardly to the camera's focal plane; which is coincidental with the uppermost film unit in the film pack. Other exposure control components forming part of the camera are located in the housing section 18. They include a shutter and exposure aperture defining mechanism and various electronic circuit modules for controlling camera operation. In the illustrated embodiment, the shutter housing section 18 further includes a switching arrangement which comprises a longitudinally extending actuator housing 56 integrally formed with and extending outwardly from the lower portion of the side wall 38. The interior surfaces of the actuator housing 56 define a guide channel for slidably receiving through a forward end opening thereof a push button slide actuator 60, and a push botton actuator 62. A detailed description of the slide actuators 60 and 62 is in the last-noted application. For purposes of this invention suffice it to say that the slide actuator 60, when in the forward position (FIG. 1), maintains the exposure cycle switch $S_1$ (FIG. 4) in its open condition, while the slide actuator 62, when in the forward position (FIG. 1), maintains the flash charging switch $S_4$ (FIG. 4) in its open condition.

In this switching arrangement, the slide actuators 60 and 62 are mounted for reciprocal movement. Normally, the slide actuators 60 and 62 are biased to their open or nonconductive states. When pushed inwardly, the actuator 62 closes a switch $S_4$ to initiate the charging of a storage capacitor (not shown) of the flash unit 12. Continued movement of the actuator 62 causes the actuator 60 to move rearwardly from its first inoperative position to its operative position, whereby the noted $S_1$ switch is closed for commencing several operations including, of course, the exposure cycle. Release of the slide actuators 60 and 62 enable them to return to their position shown in FIG. 1 so as to automatically open the switches $S_1$ and $S_4$; respectively.

Referring back to the flash unit 12, it includes a strobe or flash housing 64 having a plurality of generally planar wall sections including bottom wall 65 and a pair of pivotal mounting legs 66. The mounting legs 66 are spaced apart for fitting over and cooperating with the mounting section 42 in a manner more fully described in the last-noted application.

Included in the flash unit 12 are various strobe components therein including a storage capacitor, adapted to be charged from the film pack battery, a gas discharge tube 70 and flash control circuits 72 (FIG. 4) on the P.C. board 68 for regulating the charging of the capacitor and controlling the application of the stored charge to the tube. In a preferred embodiment, flash unit 12 is of the type described in commonly assigned U.S. Pat. No. 4,192,587. Basically, the time at which the flash is fired can be varied subsequent to the commencement of a photographic exposure interval in accordance with variations in the ambient scene light intensity and the camera-to-subject range. Although an electronic type flash unit 12 is described, this invention contemplates use of other types of flash arrangements.

To move the flash unit 12 to the erect position from the nonerect position, the flash housing 64 is grasped by the user and moved upwardly so as to pivot it in a counterclockwise direction about the mounting posts (not shown) mounting the legs 66 to the housing section 18.

This embodiment includes a second manually actuatable switch arrangement for performing certain photographic functions. Extending through an opening 74 formed in the bottom wall 65 is a finger engageable button 76 of a manually actuated infinity switch member 78 (FIG. 3). This switch member 78 is connected at one end to the P.C. board 68 and has its generaly elongated portion interposed in a space between the bottom of the board and the inner surface of the bottom wall 65. The switch member 78 is a momentary type switch which returns to its normal circuit condition when the actuating force is released. Towards this end the switch member 78 is inherently resilient and because of this the finger engageable button 76 is biased outwardly through the opening 74. In this manner, the switch member 78 is out of electrical contact with the P.C. board 68 and in its non-conductive state. When the spring button 76 is pushed upwardly when the flash unit 12 is erect, the switch member 78 makes contact with the P.C. board 68 and effects closing of the switches $S_5$ and $S_6$ (FIG. 4). Release of the manual force allows the switch member 78 to resume the nonconductive state. The effect of closing the switches $S_5$ and $S_6$ is more fully described and claimed in copendng application Ser. No. 194,572, U.S. Pat. No. 4,291,965, issued Sept. 29, 1981 which is concurrently filed and commonly assigned herewith. It will be understood that in the present invention the photographic operation effected by the switch member 78 does not form an aspect of the invention. Consequently, for a more detailed explanation of the effects of the switch member 78 in closing switches $S_5$ and $S_6$, reference is made to the last-noted application where the components shown in FIG. 4 are more completely described in the context of the overall photographic operation. Hence, the description of the circuit is incorporated by reference. Briefly, for better understanding this invenion closing of the switches $S_5$ and $S_6$ effects depression of the flash firing by the flash unit 12, as well as displaces at least one element (not shown) of the variable focus lens arrangement 46 so that the lens arrangement will focus objects at, for example, the hyperfocal lens range or infinity.

In accordance with the present invention, the second switch arrangement of this invention achieves a variety of advantageous results.

In this regard, it significantly diminishes inadvertent actuation of the switch member 78 by its positioning. Towards this end, the switch member 78 is constructed and arranged to extend from the bottom wall 65. This is significant because when the flash unit 12 is in its nonerect position, it can be accommodated by the photocell aperture 50 (FIG. 2) and when the flash unit is in the erect position, it is engageable for actuation. By having the button 76 extend from the bottom of the flash unit 12 when the latter is erect, the likelihood of the button being actuated is significantly diminished since it is spaced remote from the switch actuators 60, 62 and is on a portion of the photographic apparatus not normally held by the average photographer. Thus, there is little likelihood of the operator's hands coming in contact therewith during framing, focusing and exposure. This is particularly significant because since the switch 78 is of the momentary type and functions to disable the transducer circuit and flash. Thus, it is extremely important that the switch 78 be actuated only when desired. Otherwise, of course, if the switch 78 is actuated when undesired, the desired photographic control is lost.

When the switch 78 is desired to be actuated, the operator can accomplish such by supporting the flash housing 64 with one hand and having, for example, the thumb of said one hand depress the button 76 inwardly for effecting closing of the switch $S_4$. The thumb would, therefore, serve to actuate the button 76 and also provide support for the flash unit 12 and the photographic apparatus. Moreover, the operator is free to use the other hand to actuate the switch members 60, 62, as well as provide support for the camera 10 with said other hand. Furthermore, the switch 78 is positioned to be on the opposite side of the longitudinal axis of the camera than the switch actuators 60, 62. In this fashion, the operator can more easily support opposing halves of the camera with two hands so as to effect a balanced support, especially during simultaneous actuation of the aforenoted switches. Another advantage arising from the positioning of the switch 78 is the fact that when the operator's hand actuates it such hand is remote from the field of view of the viewfinder 24 and the lens 46. Consequently, inadvertent interference by the operator's hand with the field of view of the lens arrangement is virtually eliminated.

Since certain changes may be made in the above-described apparatus without departing from the scope of the invention herein involved, it is intended that all matter contained in the description or shown in the accompanying drawings shall be interpreted as illustrative and not in a limiting sense.

What is claimed is:

1. In a hand held camera having a camera body; a foldable flash unit mounted on the camera body for pivotal movement with respect to the camera body between an erect, operative position and a folded, inoperative position; a first actuator manually connected to the camera body and being operable for effecting a photographic cycle; the first actuator being positioned so that one hand of the camera operator may be used to actuate it while simultaneously supporting the camera; and a second actuator manually operable for affecting the photographic cycle when said second actuator is operative generally contemporaneously with actuation of said first actuator; the improvement wherein the second actuator is positioned on the foldable flash unit so as to be accessible only to manual operation by the operator's second hand when the flash unit is in its erect position and, the second actuator is inaccessible to manual operation when the flash unit is in the folded position, the second actuator being operable by the second operator hand during operation of the first actuator so that both hands of the operator are located for effectively holding the camera in a stable picture taking condition.

2. In a hand held photophraphic camera having a camera body, a foldable flash unit mounted on the camera body for pivotal movement with respect to the camera body between an inoperative folded position and an operative erect position, a first manual actuator being operable to effect a first given photographic cycle of the camera, the first actuator being positioned to enable one hand of an operator to actuate it as well as simultaneously support the camera body, a second manual switching actuator operable for modifying the first cycle so as to produce a second given cycle, the improvement wherein: said second actuator is mounted on the flash unit so that when the flash unit is in its inoperative position the second actuator is shielded so as to be protected against inadvertent actuation, and when the flash unit is in its operative erect position, the second actuator is exposed for manual actuation thereof by the other hand of the user, the second actuator when exposed being positioned relative to the first actuator and the camera body so that the second operator hand must operate it and so that during actuation of the second actuator generally simultaneously with the first actuator both operator hands can effectively hold the apparatus in a stable picture taking condition which minimizes camera shaking during the photographic operation.

3. The apparatus of claim 2 wherein said second actuator includes a switching member biased outwardly so as to be accessible to manual manipulation by the other hand and said switching member capable of being moved inwardly to effect a desired switching operation.

4. The apparatus of claim 3 wherein said switcing member is a momentary switch which must be continuously urged inwardly to provide for the desired switching operation.

5. The apparatus of claim 3 wherein said switching member projects outwardly from the bottom surface of said flash unit when said flash unit is in its operative position and when operated by the hand tends to avoid having the hand interfere with a lens of the camera and said first actuator includes at least one manual actuator connected to a portion of said body which is on the opposing half of the camera body remote from said switching member.

6. The apparatus of claim 5 wherein said body is formed with a recess constructed to receive said switching member when said flash unit is in the folded position whereby inadvertent manipulation of said biased switching member is precluded.

* * * * *